US006812321B1

(12) United States Patent
Heitz et al.

(10) Patent No.: US 6,812,321 B1
(45) Date of Patent: Nov. 2, 2004

(54) METHOD FOR THE CONTINUOUS PRODUCTION OF POLYBUTYLENETEREPHTHALATE FROM TEREPHTHALIC ACID AND BUTANEDIOL

(75) Inventors: Thomas Heitz, Dannstadt-Schauernheim (DE); Martin Klatt, Mannheim (DE); Ralf Neuhaus, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 43 days.

(21) Appl. No.: 10/018,473

(22) PCT Filed: Jun. 28, 2000

(86) PCT No.: PCT/EP00/05514

§ 371 (c)(1),
(2), (4) Date: Dec. 19, 2001

(87) PCT Pub. No.: WO01/00705

PCT Pub. Date: Jan. 4, 2001

(30) Foreign Application Priority Data

Jun. 29, 1999 (DE) .......................................... 199 29 790

(51) Int. Cl.⁷ ........................ C08G 63/00; C08G 85/00; C07C 69/76; C07C 67/08
(52) U.S. Cl. .................. 528/309.1; 528/308; 528/308.6; 528/308.8; 526/71; 560/76; 560/98
(58) Field of Search ............................... 528/309.1, 308, 528/308.6, 308.8, 279, 283, 274, 272, 275; 526/71; 560/76, 98

(56) References Cited

U.S. PATENT DOCUMENTS

| 4,056,514 A | * | 11/1977 | Strehler et al. ............. 528/279 |
| 4,346,213 A | * | 8/1982 | Hall, Jr. et al. ............. 528/272 |
| 4,439,597 A | | 3/1984 | Hall, Jr. |
| 4,499,261 A | * | 2/1985 | Heinze et al. ............... 528/279 |
| 4,656,241 A | * | 4/1987 | Iida et al. .................... 528/279 |
| 4,670,580 A | | 6/1987 | Maurer |
| 4,680,376 A | | 7/1987 | Heinze |
| 5,015,759 A | | 5/1991 | Lowe |
| 5,519,108 A | * | 5/1996 | Yuo et al. .................... 528/287 |

FOREIGN PATENT DOCUMENTS

| DE | 35 44 551 | 6/1987 |
| DE | 269 296 | 6/1989 |
| DE | 44 15 220 | 11/1995 |
| DE | 195 09551 | 9/1996 |
| EP | 046 670 | 3/1982 |
| EP | 240 279 | 10/1987 |
| EP | 431 977 | 6/1991 |
| GB | 2 174 129 | 6/1987 |

OTHER PUBLICATIONS

Derwent Abst. 89–348684/48.
Derwent Abst. 95–374709/49.

* cited by examiner

Primary Examiner—Ba K. Trinh
Assistant Examiner—Taylor V Oh
(74) Attorney, Agent, or Firm—Keil & Weinkauf

(57) ABSTRACT

In a process for the continuous preparation of polybutylene terephthalate from terephthalic acid and 1,4-butanediol comprising:
a) direct esterification of terephthalic acid with 1,4-butanediol in a reactor cascade comprising at least two reactors,
b) precondensation of the esterification product obtained in stage a), and
c) polycondensation of the precondensate obtained in stage b),
the reaction pressure decreases and the temperature does not increase along the reactor cascade in stage a).

10 Claims, No Drawings

METHOD FOR THE CONTINUOUS PRODUCTION OF POLYBUTYLENETEREPHTHALATE FROM TEREPHTHALIC ACID AND BUTANEDIOL

The present invention relates to a process for the continuous preparation of polybutylene terephthalate (PBT) from terephthalic acid (TPA) and 1,4-butanediol (BDO).

The preparation of polybutylene terephthalate from dimethyl terephthalate (DMT) and 1,4-butanediol is known from the prior art. A disadvantage of this process is that tetrahydrofuran (THF) formed in small amounts as by-product forms an azeotrope with the methanol liberated during the reaction and therefore can be recovered as a material of value only with great difficulty.

The direct preparation of polybutylene terephthalate from terephthalic acid and 1,4-butanediol is made difficult by the formation of relatively large amounts of THF, resulting in loss of 1,4-butanediol required for the reaction. Furthermore, not only THF but also 2,5-dihydrofuran (2,5-DHF) is formed from 1,4-butanediol. The 2,5-dihydrofuran is difficult to separate from THF and therefore contaminates and reduces the quality of the valuable product THF. A further problem in the direct preparation of polybutylene terephthalate from terephthalic acid and 1,4-butanediol is that terephthalic acid is not soluble in 1,4-butanediol and goes into solution only during the esterification with 1,4-butanediol. However, to produce high quality polybutylene terephthalate, it is extremely important for this to be free of contaminants such as free acid groups from terephthalic acid. For this reason, the terephthalic acid should be completely esterified and dissolved before the actual polycondensation commences.

Processes concerned with the direct preparation of polybutylene terephthalate from terephthalic acid and 1,4-butanediol are already known from the prior art.

DD-A 269 296 relates to a continuous process for preparing polyalkylene terephthalates. Setting of appropriate reaction parameters in the esterification step of the dicarboxylic acid used with the glycol used is said to decisively favor removal of water from the esterification phase so that esterification products are obtained both with a high degree of conversion and a high mean degree of polymerization. The esterification step is carried out in a reactor cascade in which the temperature is increased and the pressure is reduced from reactor to reactor. The example described relates to the preparation of polyethylene terephthlate from terephthalic acid and ethylene glycol.

EP-A 0 431 977 describes a process for increasing the direct esterification rate of a diacid and 1,4-butanediol to esterification of >95% of the acid groups. The process can be carried out continuously in three reactors. The process described comprises:

a) mixing 1,4-butanediol and diacid in a ratio of at least 2:1, b) heating the reaction mixture to 180° C., c) adding a suitable catalyst and d) reacting the mixture at atmospheric pressure and a mean temperature in the range from 180 to 245° C. for a maximum of 60 minutes.

In this process, less than 5% of the 1,4-butanediol is said to be cyclized to THF. However, the content of free acid groups in the end product is high.

DE-A 44 15 220 describes a process for preparing polyesters in a specific apparatus. The process is carried out under decreasing hydrostatic pressure and increasing reaction temperature. No information is given on the formation of THF.

DE-A 35 44 551 relates to the continuous preparation of polybutylene terephthalate from terephthalic acid and 1,4-butanediol. The preparation is carried out in three stages. The first stage, namely the esterification, is carried out at from 225 to 260° C. and a pressure of from 0.1 to 1 bar. The second stage, the precondensation, is carried out at from 230 to 260° C. and a pressure of from 10 to 200 mbar, and the third stage, the polycondensation, is carried out at from 240 to 265° C. and a pressure of from 0.25 to 25 mbar.

It is an object of the present invention to provide a process for preparing polybutylene terephthalate which is improved compared to the prior art. In particular, formation of THF and 2,5-dihydrofuran from the 1,4-butanediol used should be as low as possible and the polybutylene terephthalate obtained should have a very low content of free acid groups.

The achievement of this object starts out from a process for the continuous preparation of polybutylene terephthalate from terephthalic acid and 1,4-butanediol, comprising:

a) direct esterification of terephthalic acid with 1,4-butanediol in a reactor cascade comprising at least two reactors, b) precondensation of the esterification product obtained in stage a), and c) polycondensation of the precondensate obtained in stage b).

In the process of the present invention, the reaction pressure decreases and the temperature does not increase along the reactor cascade in stage a).

The polybutylene terephthalate prepared with the aid of the process of the present invention is of excellent quality. It has a low content of acid and alcohol groups. The formation of THF and 2,5-dihydrofuran from 1,4-butanediol is low in the process of the present invention. As a result, only little 1,4-butanediol is lost, so that the yield of polybutylene terephthalate based on 1,4-butanediol is high.

a) Esterification stage

The stage a) is carried out in a reactor cascade comprising at least two reactors, preferably from two to five reactors, particularly preferably three reactors. The reactors used are generally stirred vessels.

According to the present invention, the esterification stage is carried out in a reactor cascade in which the reaction pressure drops from reactor to reactor. The esterification is preferably carried out at a pressure of <1 bar.

In a reactor cascade comprising three reactors, the pressure in the first reactor (p1) is generally set to <1 bar, preferably <900 mbar, particularly preferably <800 mbar. The pressure in the second reactor (p2) is <p1, preferably <p1–100 mbar, particularly preferably <p1–150 mbar. In the third reactor, esterification is carried out at a pressure (p3) of <p2, preferably <p2–100 mbar. Thus, the pressure is preferably from 650 to 900 mbar in the first reactor (p1), from 500 to 700 mbar in the second reactor (p2) and from 350 to 600 mbar in the third reactor (p3), with the pressure in the individual reactors decreasing from reactor to reactor within the specified ranges.

The preferred process conditions with a pressure of less than 1 bar give a still better suppression of THF formation from 1,4-butanediol.

The temperature range for the overall esterification stage is generally from 170 to 250° C., preferably from 180 to 240° C., particularly preferably from 190 to 230° C. According to the present invention, the temperature does not increase along the reactor cascade, i.e. the esterification temperature is approximately equal in each reactor of the reactor cascade or drops from reactor to reactor.

The residence times for the overall esterification stage are generally from 140 to 430 minutes, preferably from 160 to 420 minutes, particularly preferably from 170 to 390 minutes. In the case of a reactor cascade made up of three reactors, the residence time in the first reactor (V1) is generally from 100 to 250 minutes, preferably from 110 to 250 minutes, particularly preferably from 120 to 240 minutes, in the second reactor (V2) generally from 20 to 105 minutes, preferably from 30 to 100 minutes, particularly preferably from 30 to 90 minutes, and in the third reactor (V3) generally from 20 to 75 minutes, preferably from 20 to 70 minutes, particularly preferably from 20 to 60 minutes.

The esterification is generally carried out using a molar excess of 1,4-butanediol in order to push the ester equilibrium in the desired direction. The molar ratios of 1,4-butanediol to terephthalic acid are generally from 1.1:1 to 3.5:1, preferably from 1.5:1 to 2.8:1, particularly preferably from 1.9:1 to 2.5:1.

In a preferred embodiment, a suspension comprising 1,4-butanediol and terephthalic acid in a molar ratio of generally <2:1, preferably <1.5:1, is placed in a reservoir and diluted with hot 1,4-butanediol so as to heat it to from 50 to 100° C., preferably from 60 to 100° C., particularly preferably from 70 to 90° C., and give a ratio of 1,4-butanediol to terephthalic acid corresponding to the above-mentioned final ratio.

An esterification catalyst, generally a Lewis acid metal compound, preferably of titanium or tin, is added to this BDO/TPA mixture. Particularly preferred esterification catalysts are tetrabutyl orthotitanate (TBOT), triisopropyl titanate and tin dioctoate, with very particular preference being given to tetrabutyl orthotitanate. The catalyst is generally used in the esterification stage in an amount of <200 ppm, preferably from 65 to 150 ppm, particularly preferably from 75 to 100 ppm, calculated as the metal of the esterification catalyst used and based on polybutylene terephthalate. All of the catalyst can be added to the first reactor. However, in a preferred embodiment only part of the catalyst, preferably <50 ppm, particularly preferably <25 ppm, calculated as the metal and based on polybutylene terephthalate, is introduced into the first reactor and the remainder of the catalyst is introduced into the subsequent reactors, preferably into the second reactor. The esterification catalyst is preferably introduced into the reactor as a mixture with 1,4-butanediol.

The reaction mixture comprising terephthalic acid, 1,4-butanediol and an esterification catalyst is reacted in a reactor cascade to a conversion of generally >97%, preferably from 97 to 99%, based on terephthalic acid. If the esterification stage is carried out in a reactor cascade having three reactors, the esterification in the first reactor generally proceeds to a conversion (C1) of >89%. The THF/water mixture formed is separated off and the reaction mixture is transferred to the second reactor in which it is esterified to a conversion (C2) of generally >95%. At this point in time, all of the terephthalic acid has generally reacted or gone into solution, which can be seen from a clear reaction mixture (clearing point). The reaction mixture is, to be safe, preferably transferred to a third reactor and esterified to a conversion (C3) of generally >97%.

The reaction mixture obtained is subsequently fractionated continuously into the esterification product and a THF/BDO/water mixture. The THF/BDO/water mixture is fractionated in a column system and recovered 1,4-butanediol is returned to the first esterification reactor. The esterification product is transferred continuously to the precondensation stage b.

b) Precondensation stage

The precondensation stage generally has at least two, preferably at least three, particularly preferably at least four, temperature zones. The temperature of a zone is generally from 1 to 25° C., preferably from 1 to 15° C., particularly preferably from 1 to 10° C., higher than the temperature of the preceding zone. The temperature range for the overall precondensation is generally from 220 to 300° C., preferably from 225 to 290° C., particularly preferably from 230 to 260° C.

In general, the precondensation is carried out in a pressure range from 0.05 bar to the esterification pressure in the last reactor of the reactor cascade of the esterification stage. It is preferably carried out so that the pressure in the first zone corresponds to the reaction pressure in the last esterification reactor, and in the following zones is generally from 20 to 500 mbar, preferably from 25 to 450 mbar, particularly preferably from 30 to 400 mbar, with the pressure preferably dropping from one zone to the following zone.

The precondensation is preferably carried out in an ascending tube reactor.

The residence times for the overall stage b) of the process are generally from 10 to 80 minutes, preferably from 15 to 70 minutes, particularly preferably from 30 to 60 minutes. In a particularly preferred embodiment, the precondensation is carried out in four temperature zones, with the temperature rising slightly from zone to zone in the above-described ratios and the pressure being reduced from the first to the fourth zone within the limits described. In this preferred embodiment, the fourth zone comprises an apparatus for separating vapor and liquid phases. In this zone, excess 1,4-butanediol, THF and water are separated from the precondensate.

The catalysts mentioned for the esterification stage of the process of the present invention can likewise be introduced in the amounts specified into the precondensation stage.

After the precondensation, the precondensate has a viscosity number of generally from 5 to 50 ml/g, preferably from 15 to 40 ml/g, measured as a 0.5% strength by weight solution in phenol/o-dichlorobenzene (1:1) in accordance with ISO 1628, Part 3 (1985), at 25° C.

The precondensate is subsequently transferred to the polycondensation reactor (stage c)).

c) Polycondensation stage

Stage c) is generally carried out in a single zone at temperatures of generally from 240 to 290° C., preferably from 240 to 270° C., particularly preferably from 240 to 265° C. The pressure is generally from 0.2 to 20 mbar, preferably from 0.3 to 10 mbar.

The residence times are usually from 30 to 180 minutes, preferably from 35 to 150 minutes.

During the polycondensation, a renewal of the surface of the product is preferably carried out. Renewal of the surface means that new polymer is continually brought to the surface of the melt so as to aid exit of the diol. This is preferably from 1 to 20 m$^2$/kg of product and minute, particularly preferably from 1.5 to 6 m$^2$/kg of product and minute.

In general, no further catalyst is added in the polycondensation stage, but it is also possible to add a catalyst, for example a catalyst as described above, in this stage of the process, too.

After the continuous polycondensation, the polyester generally has a viscosity number of from 60 to 180 ml/g, preferably from 90 to 160 ml/g, determined in a 0.5% strength by weight solution in a phenol/o-dichlorobenzene mixture (weight ratio=1:1, at 25° C.) in accordance with ISO 1628, Part 3 (1985).

In the polycondensation stage of the process of the present invention, lubricants and nucleating agents are preferably added together to the polymer melt when the viscosity number has reached at least 80%, preferably at least 95%, particularly preferably 100%, of the desired final viscosity number of the polyester, and the melt is, if desired, postcondensed and subsequently discharged, cooled and granulated. The lubricant is preferably added in an amount of generally from 0.01 to 3% by weight, preferably from 0.1 to 1% by weight, particularly preferably from 0.2 to 0.8% by weight, and the nucleating agent is added in an amount of generally from 0.001 to 2% by weight, preferably from 0.01 to 1% by weight, particularly preferably from 0.03 to 0.5% by weight, in each case based on 100% by weight of polybutylene terephthalate.

The addition is particularly preferably in the form of a suspension, with the nucleating agent being suspended in the lubricant, if desired at elevated temperature, prior to addition to the melt. Depending on the type of lubricant used, it may be necessary to heat the mixture of lubricant and nucleating agent to generally from 30 to 150° C., preferably from 60 to 130° C., in order to prepare a suspension and subsequently add it to the polymer melt.

Examples of suitable lubricants are low molecular weight polyethylene waxes which are solid at room temperature and have to be heated to prepare a suspension of the nucleating agent. Such lubricants are low molecular weight polyethylene waxes which may advantageously contain functional groups such as glycidyl and/or carboxyl groups and have a mean molecular weight $M_n$ (number average) of generally from 500 to 20,000 g/mol, preferably from 1000 to 10,000 g/mol, particularly preferably from 1000 to 5000 g/mol and very particularly preferably from 1000 to 3000 g/mol.

The molecular weight is usually determined by gel permeation chromatography (GPC) using an LDPE standard (low density polyethylene). The melt viscosity is preferably from 100 to 5000 mm$^2$/g, particularly preferably from 100 to 3000 mm$^2$/g and very particularly preferably from 100 to 2000 mm$^2$/g, (in accordance with DIN 51 562) at 120° C.

Suitable nucleating agents are, in particular, minerals selected from the group consisting of alkali metal (alumino) silicates and/or alkaline earth metal (alumino)silicates, preferably selected from the group consisting of island silicates or sheet silicates. All possible compounds such as hydroxides, carbonates, hydroxycarbonates, sulfates, silicates and phosphates and phosphonates can be used. Further suitable nucleating agents which may be mentioned are alkali metal or alkaline earth metal salts of organic or inorganic acids, for example sodium antimonate, calcium stearate, sodium terephthalate, calcium citrate and metal acids (basic acids) of titanium or tungsten.

Suitable derivatives of inorganic acids are preferably phosphoric acid derivatives, with particular preference being given to sodium phenylphosphinate, zinc phosphate, calcium bis(3,5-di-tert-butylethylphosphonate) (Irganox® 1425 from Ciba Geigy AG) and tetrakis(2,4-di-tert-butylphenyl) 4,4-biphenylenediphosphonite.

Suitable polycondensation apparatus are known to those skilled in the art. In a particularly preferred embodiment, it is possible to discharge the melt from the polycondensation reactor, to add the mixture of lubricant and nucleating agent by means of suitable devices, e.g. a metering pump with heating, and subsequently to transfer the polymer melt to, for example, a "Sulzer" tube and condense it to the desired final viscosity, at the same time homogenizing the melt, and then discharge, cool and granulate it.

The polybutylene terephthalate obtained generally has an acid number of <50 meq/kg, preferably <35 meq/kg, particularly preferably <30 meq/kg. The acid number was determined by titration with sodium hydroxide.

The process of the present invention has the advantage that only small amounts of THF are formed from 1,4-butanediol, and thus only little 1,4-butanediol is lost. In general, the amount of THF formed, based on the amount of polybutylene terephthalate obtained, is <5% by weight, preferably <4% by weight, particularly preferably <3.5% by weight. Likewise, only little 2,5-dihydrofuran is formed from 1,4-butanediol. The amount of 2,5-dihydrofuran formed is preferably <150 ppm, particularly preferably <100 ppm, based on the amount of polybutylene terephthalate obtained.

The following examples illustrate the invention.

EXAMPLES

Experimental Procedure

Esterification Stage with Constant Temperature and Decreasing Pressure

Terephthalic acid is premixed with 1,4-butanediol in a molar ratio of terephthalic acid to 1,4-butanediol of 1:1.2, placed in a reaction vessel R1 and made up with 1,4-butanediol. TBOT (1), i.e. part of the esterification catalyst, is mixed into the 1,4-butanediol. The mixture runs through a total of 8 reaction zones (3 reaction vessels R1 to R3 (esterification stage a)), 4 reaction zones in an upright tube R4 to R7 (precondensation stage b)) and the polycondensation reactor R8 (polycondensation stage c))) to the final polybutylene terephthalate, at temperatures T1 to T8, pressures p1 to p8 and residence times V1 to V8, with the pressures p1 to p3 decreasing in the reaction zones R1 to R3. In R2, an additional amount of TBOT (2) was metered in. The distillates from R1 to R3, which contained essentially 1,4-butanediol, THF and water, were fractionated continuously in a column system and 1,4-butanediol was returned to R1 and the remainder (essentially water and THF) was condensed in a collection vessel and analyzed. The collection vessel for the distillates was cooled to −20° C. by means of a cryostat so that the volatile THF did not vaporize. In addition, a sample was taken at the overflow from R1 to R2, from R2 to R3 and from R3 to R4, and the conversions C1 to C3 were determined by determination of the acid number. The clearing point was determined visually. THF was determined quantitatively by means of gas chromatography and its ratio to the amount of polybutylene terephthalate obtained was calculated, i.e. at a THF formation of 5%, 50 g of THF are formed per kilogram of polybutylene terephthalate. The end groups of the polybutylene terephthalate products obtained were determined by titration. The viscosity measurement (VN measurement) was carried out in accordance with ISO 1628 in phenol/o-dichlorobenzene.

The esterification product was passed to an upright tube divided into four heating zones.

The temperature in the fourth reaction zone was 247° C. at a pressure which corresponded to the pressure in the third reactor of the esterification stage and a mean residence time of 22 minutes.

The temperature in the fifth reaction zone was 252° C. at a pressure of 400 mbar and a mean residence time of 11 minutes.

The temperature in the sixth reaction zone was 256° C. at a pressure of 30 mbar and a mean residence time of 18 minutes.

The excess 1,4-butanediol and the reaction products such as THF and water were separated off at the upper end of the reaction tube. The precondensate was transferred without further addition of catalysts to a polycondensation reactor (zone 8).

The temperature in the eighth reaction zone was 257° C. at a pressure of 0.4 mbar, a mean residence time of 115 minutes and a surface renewal of 4 m$^2$/h*kg of polybutylene terephthalate.

Table 1 shows the results obtained using the experimental procedure 1 and also the results of the comparative experiments Comp. 1 to Comp. 4.

Experimental parameters which were not varied:

| | |
|---|---|
| T4, T5, T6, T7, T8 = | 247° C., 252° C., 255° C. and 257° C. |
| P4 = | p3 |
| p5, p6, p7, p8 = | 400 mbar, 150 mbar, 30 mbar and 0.4 mbar |
| V4, V5, V6, V7, V8 = | 22 minutes, 11 minutes, 5 minutes, 18 minutes and 115 minutes |
| Throughput: BDO:TPA = | 450 g/h:690 g/h |
| Yield of PBT: | 910 g/h |

TABLE 1

|  | 1 | 2 | 3 | 4 | 5 | 6 | Comp. 1 () | Comp. 2 | Comp. 4 (*) |
|---|---|---|---|---|---|---|---|---|---|
| TBOT (1) | 15 | 15 | 15 | 15 | 20 | 20 | 15 | 15 | 75 |
| TBOT (2) | 100 | 100 | 100 | 100 | 100 | 100 | 100 | 100 | — |
| BDO (g/h) | 370 | 370 | 370 | 370 | 370 | 370 | 370 | 370 | 420 |
| p1 | 800 | 850 | 900 | 900 | 600 | 600 | 800 | 800 | 650 |
| p2 | 600 | 650 | 700 | 700 | 500 | 500 | 700 | 800 | |
| p3 | 400 | 500 | 600 | 600 | 400 | 400 | 600 | 800 | |
| T1 | 215 | 220 | 225 | 230 | 210 | 210 | 215 | 215 | 217 |
| T2 | 215 | 220 | 225 | 230 | 210 | 210 | 225 | 215 | — |
| T3 | 215 | 220 | 225 | 230 | 210 | 210 | 230 | 215 | — |
| V1 | 182 | 182 | 182 | 182 | 182 | 212 | 182 | 182 | 182 |
| V2 | 63 | 63 | 63 | 63 | 63 | 78 | 63 | 63 | — |
| V3 | 40 | 40 | 40 | 40 | 40 | 65 | 40 | 40 | — |
| C1 | 90.3 | 90.8 | 91.1 | 93.5 | 87.2 | 89.2 | 90.4 | 90.2 | 90.5 |
| C2 | 92.1 | 93.5 | 93.9 | 96.1 | 91.4 | 92.7 | 94.1 | 91.7 | — |
| C3 | 97.8 | 98.1 | 98.2 | 98.4 | 94.2 | 95.3 | 98.5 | 96.3 | — |
| Clearing point | yes | yes | yes | yes | yes(*) | Yes | yes | yes | no |
| THF (%) | 2.14 | 2.11 | 2.37 | 2.53 | 2.01 | 2.21 | 3.89 | 3.15 | 7.32 |
| 2,5-DHF (%) | 0.012 | 0.010 | 0.013 | 0.018 | 0.009 | 0.015 | 0.036 | 0.028 | 0.042 |
| OH | 24 | 25 | 23 | 24 | 24 | 23 | 23 | 24 | 52 |
| COOH | 25 | 25 | 25 | 24 | 41 | 24 | 24 | 25 | 143 |
| VN | 125 | 122 | 126 | 131 | 130 | 128 | 125 | 127 | 95 |

(*) In the experiments under these conditions, the reaction solution was still very slightly turbid.
(**) Method analogous to DD-A 269 296, decreasing pressure and increasing temperature.
(***) Method analogous to DE-A 35 445 51, Ex. 9; unlike the preceding experiments, the esterification was carried out at a pressure of 0.65 bar. Since the boiling point of 1,4-butanediol at 0.65 bar is about 210° C., the reaction temperature described in Ex. 9 (245° C.) could not be reached. When the temperature of the heating bath was increased, 1,4-butanediol distilled off, as a result of which the temperature of the reaction mixture settled down to 217° C.

We claim:

1. A process for the continuous preparation of polybutylene terephthalate from terephthalic acid and 1,4-butanediol, comprising:
   a) direct esterification of terephthalic acid with 1,4-butanediol in a reactor cascade comprising at least two reactors,
   b) precondensation of the esterification product obtained in stage a), and
   c) polycondensation of the precondensate obtained in stage b),
wherein the reaction pressure decreases and the temperature does not increase along the reactor cascade in stage a).

2. A process as claimed in claim 1, wherein the esterification in stage a) is carried out at pressures of <1 bar.

3. A process as claimed in claim 1, wherein, in a reactor cascade comprising three reactors, the pressure in the first reactor (p1) is <1 bar, the pressure in the second reactor (p2) is <p1−100 mbar and the pressure in the third reactor (p3) is <p2.

4. A process as claimed in claim 1, wherein the esterification stage a) is carried out at from 170 to 250° C.

5. A process as claimed in claim 1, wherein the molar ratio of 1,4-butanediol to terephthalic acid at the beginning of stage a) is from 1.1:1 to 3.5:1.

6. A process as claimed in claim 1, wherein the conversion after the last reactor of stage a) is >97%, based on terephthalic acid, before the precondensation in stage b) commences.

7. A process as claimed in claim 1, wherein the direct esterification stage a) is carried out in the presence of tetrabutyl orthotitanate as a catalyst.

8. A process as claimed in claim 1, wherein the precondensation stage b) is carried out at temperatures from 220 to 300° C. and pressures in the range from 0.05 bar to the esterification pressure in the last reactor of the reactor cascade of stage a).

9. A process as claimed in claim 1, wherein the precondensate in stage b) is polycondensed in stage c) at from 240 to 290° C. and pressures of from 0.2 to 20 mbar.

10. A process as claimed in claim 9, wherein the polycondensation is continued until the polycondensate obtained has an acid number of <50 meq/kg.

* * * * *